United States Patent
Gahleitner et al.

(10) Patent No.: US 10,053,524 B2
(45) Date of Patent: *Aug. 21, 2018

(54) POLYPROPYLENE WITH BROAD MOLECULAR WEIGHT DISTRIBUTION

(71) Applicant: Borealis AG, Vienna (AT)

(72) Inventors: Markus Gahleitner, Neuhofen/Krems (AT); Norbert Hafner, Linz (AT); Antonis Gitsas, Linz (AT); Klaus Bernreitner, Linz (AT)

(73) Assignee: BOREALIS AG (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/387,355

(22) Filed: Dec. 21, 2016

(65) Prior Publication Data

US 2017/0101487 A1 Apr. 13, 2017

Related U.S. Application Data

(63) Continuation of application No. 14/896,640, filed as application No. PCT/EP2014/062021 on Jun. 10, 2014, now Pat. No. 9,550,844.

(30) Foreign Application Priority Data

Jun. 19, 2013 (EP) .................................... 13172874

(51) Int. Cl.
*C08F 110/06* (2006.01)
*C08L 23/12* (2006.01)

(52) U.S. Cl.
CPC ............. *C08F 110/06* (2013.01); *C08L 23/12* (2013.01); *C08F 2410/04* (2013.01); *C08F 2500/04* (2013.01); *C08F 2500/12* (2013.01); *C08F 2500/17* (2013.01); *C08L 2205/025* (2013.01); *C08L 2205/03* (2013.01); *C08L 2314/02* (2013.01)

(58) Field of Classification Search
None
See application file for complete search history.

(56) References Cited

U.S. PATENT DOCUMENTS

| 5,536,789 A | 7/1996 | Schwager et al. |
| 9,550,844 B2 * | 1/2017 | Gahleitner ............ C08F 110/06 |
| 2003/0212193 A1 | 11/2003 | Takeshi et al. |

FOREIGN PATENT DOCUMENTS

| CN | 1079968 A | 12/1993 |
|----|-----------|---------|
| CN | 1236375 A | 11/1999 |
| CN | 1287566 A | 3/2001 |
| CN | 1832999 A | 9/2006 |
| CN | 101821303 A | 9/2010 |
| CN | 101896509 A | 11/2010 |
| CN | 102549063 A | 7/2012 |
| CN | 102695757 A | 9/2012 |
| CN | 103154124 A | 6/2013 |
| CN | 103201339 A | 7/2013 |
| CN | 103443194 A | 12/2013 |
| EP | 0887379 A1 | 12/1998 |
| EP | 0887380 A1 | 12/1998 |
| EP | 0887381 A1 | 12/1998 |
| EP | 09195712 A1 | 6/1999 |
| EP | 0991684 B1 | 1/2006 |
| EP | 2452976 A1 | 5/2012 |
| EP | 2495280 A1 | 9/2012 |
| JP | H10-176008 A | 6/1998 |
| JP | H11-42664 A | 2/1999 |
| JP | 2008-516025 A | 5/2008 |
| JP | 2011-519649 A | 7/2011 |
| WO | 9212182 A1 | 7/1992 |
| WO | 9924478 A1 | 5/1999 |
| WO | 9924479 A1 | 5/1999 |
| WO | 00/26295 A1 | 5/2000 |
| WO | 0068315 A1 | 11/2000 |
| WO | 2004000899 A1 | 12/2003 |
| WO | 2004111095 A1 | 12/2004 |
| WO | 2006/037705 A1 | 4/2006 |
| WO | 2009007467 A1 | 6/2009 |
| WO | 2010089123 A1 | 8/2010 |
| WO | 2010/097409 A1 | 9/2010 |
| WO | 2011076611 A1 | 6/2011 |
| WO | 2011117103 A1 | 9/2011 |
| WO | 2012/171745 A1 | 12/2012 |
| WO | 2014/166779 A1 | 10/2014 |

OTHER PUBLICATIONS

Notification of Reason for Rejection for Japanese Patent Application No. 2015-563168, dated Jul. 14, 2016.
Office Action for Chinese Patent Application No. 201480032606.1, dated Jul. 4, 2016.
Japanese Patent Office Examination Handbook Part II Chapter 2 Requirements for Claims, pp. 8-13.
Busico, Vincenzo, et al., "Full Assignment of the 13C NMR Spectra of Regioregular Polypropylenes: Methyl and Methylene Region", Macromolecules 1997, 30, 6251-6263.
Busico, Vincenzo, et al., "Microstructure of Polypropylene", Prog. Polym. Sci 26 (2001) 443-533.
Busico, Vincenzo, et al., "ALK-1-ENE Polymerization in the Presence of a Monocyclopentadienyl Zirconium(IV) Acetamidinate Catalyst: Microstructural and Mechanistic Insights", Macromol. Rapid Commun. 2007, 28, 1128-1134.
Cheng, H.N., "13C Nmranalysis of Ethylene-Propylene Rubbers", Macromolecules 1984, 17, 1950-1955.
Resconi, Luigi, et al., "Selectivity in Propene Polymerization With Metallocene Catalysts", Chem. Rev. 2000, 100, 1253-1345.

(Continued)

*Primary Examiner* — Richard A Huhn

(74) *Attorney, Agent, or Firm* — Tarolli, Sundheim, Covell & Tummino LLP

(57) ABSTRACT

Propylene homopolymer having a melt flow rate MFR$_2$ (230° C.) at least 50 g/10 min, a Mw/Mn at least 12.0 and a xylene cold soluble content (XCS) of at least 2.8 wt.-%.

16 Claims, No Drawings

(56) References Cited

OTHER PUBLICATIONS

Wang, Wen-Jun, el al., "Structural Analysis of Ethylene/Propylene Copolymers Synthesized 1/Vith a Constrained Geometry Catalyst", Macromolecules 2000, 33, 1157-1162.

Zhou, Zhe, et al., "A New Decoupling Method for Accurate Quantification of Polyethylene Copolymer Composition and Triad Sequence Distribution With 13C NMR", Journal of Magnetic Resonance 187 {2007) 225-233.

Zweifel, Plastic Additive Handbook, 2001, pp. 871-874.

Notification of Reason for Rejection for Japanese Patent Application No. 2015-563168, dated Dec. 14, 2016.

* cited by examiner

POLYPROPYLENE WITH BROAD MOLECULAR WEIGHT DISTRIBUTION

The present invention is directed to a new propylene homopolymer with broad molecular weight distribution and its manufacture.

Polypropylene is used in many applications. Depending on its end applications the properties of the polypropylene must be tailored accordingly. For instance for some end applications very high stiffness and flowability are required.

WO 2011076611 A1 describes a heterophasic system. However the product has low flowability and moderate stiffness.

WO 2010/089123 A1 defines a polypropylene material with a melt flow rate $MFR_2$ (230° C.) up 12 g/10 min. The molecular weight distribution (Mw/Mn) does not exceed 8.

WO 2011/117103 describes a propylene copolymer with rather low stiffness. The melt flow rate is very low.

Accordingly there is still the demand to provide polypropylene material with exceptional high stiffness paired with high flowability.

The finding of the present invention is to provide a propylene homopolymer with a melt flow rate $MFR_2$ (230° C.) of at least 50 g/10 min and a broad molecular weight distribution (Mw/Mn), i.e. of at least 12.0.

Accordingly the present invention is directed in a first aspect to a propylene homopolymer having (a) a melt flow rate $MFR_2$ (230° C.) measured according to ISO 1133 of at least 50 g/10 min;
(b) a ratio of weight average molecular weight (Mw) to number average molecular weight (Mn) [Mw/Mn] of at least 12.0; and
(c) a xylene cold soluble content (XCS) determined according ISO 16152 (25° C.) of at least 2.8 wt.-%.

In one embodiment said propylene homopolymer is not α-nucleated, preferably not nucleated at all. In a preferred embodiment the propylene homopolymer is α-nucleated.

In a second aspect the present invention is directed to a propylene homopolymer having (a) a melt flow rate $MFR_2$ (230° C.) measured according to ISO 1133 of at least 50 g/10 min;
(b) a ratio of the complex viscosity eta* at 0.05 rad/sec to the complex viscosity eta* at 300 rad/sec of at least 4.0; and
(c) a xylene cold soluble content (XCS) determined according ISO 16152 (25° C.) of at least 2.8 wt.-%.

In one embodiment said propylene homopolymer is not α-nucleated, preferably not nucleated at all. In a preferred embodiment the propylene homopolymer is α-nucleated.

It has been found that the propylene homopolymers according to this invention are featured by very high stiffness by keeping the melt flow rate $MFR_2$ (230° C.) on a high level.

In the following the invention will be described in more detail. Both aspects indicated above are discussed together.

According to the present invention the expression "polypropylene homopolymer" relates to a polypropylene that consists substantially, i.e. of at least 99.0 wt.-%, more preferably of at least 99.5 wt.-%, of propylene units. In another embodiment only propylene units are detectable, i.e. only propylene has been polymerized.

One requirement of the propylene homopolymer according to this invention is its rather high melt flow rate. Accordingly the propylene homopolymer has an $MFR_2$ (230° C.) measured according to ISO 1133 of at least 50 g/10 min, preferably in the range of 50 to 1000 g/10 min, more preferably in the range of 60 to 500 g/10 min, still more preferably in the range of 70 to 300 g/10 min.

Another requirement for the propylene homopolymer is its broad molecular weight distribution. In the present application the molecular weight distribution is determined by the Gel Permeation Chromatography (GPC). The number average molecular weight (Mn) is an average molecular weight of a polymer expressed as the first moment of a plot of the number of molecules in each molecular weight range against the molecular weight. In effect, this is the total molecular weight of all molecules divided by the number of molecules. The number average molecular weight (Mn) is very sensitive to changes in the weight fractions of low molecular weight species. In turn, the weight average molecular weight (Mw) is the first moment of a plot of the weight of polymer in each molecular weight range against molecular weight. The weight average molecular weight (Mw) is very sensitive to changes in number of large molecules in a given sample of a polymer. Finally the z-average molecular weight (Mz) gives information about the very high molecular weight species of the polymer.

Accordingly the propylene homopolymer according to this invention has a ratio of weight average molecular weight (Mw) to number average molecular weight (Mn) [Mw/Mn] of at least 12.0, preferably in the range of 12.0 to 16.5, more preferably in the range of 12.5 to 16.0, still more preferably in the range of 13.0 to 15.7.

Additionally it is preferred that the propylene homopolymer has a ratio of z-average molecular weight (Mz) to weight average molecular weight (Mw) [Mz/Mw] of at least 6.0, more preferably of 6.0 to 12.0, still more preferably in the range of 6.0 to 10.0, yet more preferably in the range of 6.5 to 9.7.

Additionally or alternatively to the previous paragraph the propylene homopolymer has a ratio of z-average molecular weight (Mz) to number average molecular weight (Mn) [Mz/Mn] at least 80, more preferably in the range of 80 to 140, still more preferably in the range of 90 to 130.

Alternatively or additionally to the Gel Permeation Chromatography (GPC) method, the propylene homopolymer can be defined by its rheology behaviour. Thus it is appreciated that the polypropylene has a ratio of the complex viscosity eta* at 0.05 rad/sec to the complex viscosity eta* at 300 rad/sec measured by dynamic rheology according to ISO 6271-10 at 230° C. of at least 4.0, preferably of at least 6.0, still more preferably in the range of 6.0 to 15.0, yet more preferably in the range of 7.0 to 14.0.

It is preferred that the propylene homopolymer according to this invention is featured by rather high cold xylene soluble (XCS) content, i.e. by a xylene cold soluble (XCS) of at least 2.5 wt.-%, like at least 2.8 wt.-%. Accordingly the propylene homopolymer has preferably a xylene cold soluble content (XCS) in the range of 2.5 to 5.0 wt.-%, more preferably in the range of 2.8 to 4.8 wt.-%, still more preferably in the range of 3.0 to 4.5 wt.-%.

The amount of xylene cold solubles (XCS) additionally indicates that the propylene homopolymer is preferably free of any elastomeric polymer component, like an ethylene propylene rubber. In other words, the propylene homopolymer shall be not a heterophasic polypropylene, i.e. a system consisting of a polypropylene matrix in which an elastomeric phase is dispersed. Such systems are featured by a rather high xylene cold soluble content.

The amount of xylene cold solubles (XCS) additionally indicates that the propylene homopolymer preferably does not contain elastomeric (co)polymers forming inclusions as a second phase for improving mechanical properties. A polymer containing elastomeric (co)polymers as insertions of a second phase would by contrast be called heterophasic and is preferably not part of the present invention. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly it is preferred that the propylene homopolymer according to this invention has no glass transition temperature below −30, preferably below −25° C., more preferably below −20° C.

On the other hand, in one preferred embodiment the propylene homopolymer according to this invention has a glass transition temperature in the range of −15 to 0° C., more preferably in the range of −12 to −2° C. These values apply in particular in case the propylene homopolymer is α-nucleated.

Further, the propylene homopolymer is preferably a crystalline. The term "crystalline" indicates that the propylene homopolymer has a rather high melting temperature. Accordingly throughout the invention the propylene homopolymer is regarded as crystalline unless otherwise indicated. Therefore the propylene homopolymer preferably has a melting temperature of more than 158° C., i.e. of more than 158 to 168° C., more preferably of at least 160° C., i.e. in the range of 160 to 168° C., still more preferably in the range of 160 to 165° C.

Preferably the propylene homopolymer is isotactic. Accordingly it is preferred that the propylene homopolymer has a rather high pentad concentration (mmmm %) i.e. more than 93.0%, more preferably more than 94.5%, like more than 94.5 to 97.5%, still more preferably at least 95.0%, like in the range of 95.0 to 97.5%.

A further characteristic of the propylene homopolymer is the low amount of misinsertions of propylene within the polymer chain, which indicates that the propylene homopolymer is produced in the presence of a Ziegler-Natta catalyst, preferably in the presence of a Ziegler-Natta catalyst (ZN-C) as defined in more detail below. Accordingly the propylene homopolymer is preferably featured by low amount of 2,1 erythro regio-defects, i.e. of equal or below 0.4 mol.-%, more preferably of equal or below than 0.2 mol.-%, like of not more than 0.1 mol.-%, determined by $^{13}$C-NMR spectroscopy. In an especially preferred embodiment no 2,1 erythro regio-defects are detectable.

Due to the low amounts of regio-defects the propylene homopolymer is additionally characterized by a high content of thick lamella. The specific combination of rather high mmmm pentad concentration and low amount of regio-defects has also impact on the crystallization behaviour of the propylene homopolymer. Thus, the propylene homopolymer of the instant invention is featured by long crystallisable sequences and thus by a rather high amount of thick lamellae. To identify such thick lamellae the stepwise isothermal segregation technique (SIST) is the method of choice. Therefore, the propylene homopolymer can be additionally or alternatively defined by the weight ratio of the crystalline fractions melting in the temperature range of above 160 to 180° C. to the crystalline fractions melting in the temperature range of 90 to 160 [(>160-180)/(90-160)].

Thus it is preferred that
(a) the weight ratio of the crystalline fractions melting in the temperature range of above 160 to 180° C. to the crystalline fractions melting in the temperature range of 90 to 160 [(>160-180)/(90-160)] of the non-nucleated propylene homopolymer is at least 1.30, more preferably in the range of 1.30 to 2.00, still more preferably in the range of 1.50 to 1.80,
or
(b) the weight ratio of the crystalline fractions melting in the temperature range of above 160 to 180° C. to the crystalline fractions melting in the temperature range of 90 to 160 [(>160-180)/(90-160)] of the α-nucleated propylene homopolymer is at least 3.00, more preferably in the range of 3.00 to 4.20, still more preferably in the range of 3.19 to 4.20, even more preferably in the range of 3.19 to 4.00,
wherein said fractions are determined by the stepwise isothermal segregation technique (SIST).

Like the crystalline fractions of the propylene homopolymer determined by the stepwise isothermal segregation technique (SIST) also the crystallization temperature depends on the crystalline form of the polymer. Accordingly it is preferred that
(a) the crystallization temperature of the the non-nucleated propylene homopolymer is at least 110° C., more preferably at least 112° C., still more preferably in the range of 110 to 125° C., like in the range of 112 to 123° C.;
or
(b) the crystallization temperature of the α-nucleated propylene homopolymer is at least 128° C., more preferably at least 130° C., still more preferably in the range of 128 to 138° C., like in the range of 130 to 136° C.

The propylene homopolymer is further featured by high stiffness. Accordingly the instant propylene homopolymer has a high tensile modulus, wherein said modulus depends on the crystalline form of the polymer. Accordingly it is preferred that
(a) the tensile modulus (specimen moulded at 180° C.) of the the non-nucleated propylene homopolymer is at least 1,950 MPa, more preferably at least 2,000 MPa, still more preferably in the range of 1,950 to 2,500 MPa, like in the range of 1,950 to 2,400 MPa;
or
(b) the tensile modulus (specimen moulded at 180° C.) of the α-nucleated propylene homopolymer is at least 2,150 MPa, more preferably at least 2,200 MPa, still more preferably in the range of 2,150 to 2,600 MPa, like in the range of 2,200 to 2,500 MPa.

The propylene homopolymer (H-PP) according to this invention preferably comprises, more preferably consists of, three fractions, namely a first propylene homopolymer fraction (H-PP1), a second propylene homopolymer fraction (H-PP2) and a third propylene homopolymer fraction (H-PP3).

Preferably the weight ratio between the first propylene homopolymer fraction (H-PP1) and the second propylene homopolymer fraction (H-PP2) [(H-PP1):(H-PP2)] is 70:30 to 40:60, more preferably 65:35 to 50:50.

Preferably the weight ratio between the second propylene homopolymer fraction (H-PP2) and the third propylene homopolymer fraction (H-PP3) [(H-PP2):(H-PP3)] is 95:5 to 50:50, more preferably 90:10 to 70:30.

Thus it is especially preferred that the propylene homopolymer comprises, preferably consist of,
(a) of the first propylene homopolymer fraction (H-PP1) is in the range of 40 to 60 wt.-%, more preferably in the range of 45 to 60 wt.-%, yet more preferably in the range of 50 to 60 wt.-%, (b) of the second propylene homopolymer fraction (H-PP2) is in the range of 25 to 59.0 wt.-%, more preferably in the range of 27 to 52 wt.-%, yet more preferably in the range of 28 to 45.5 wt.-%, and
(c) of the third propylene homopolymer fraction (H-PP3) is in the range of 1.0 to 15.0 wt.-%, more preferably in the range of 3.0 to 13.0 wt.-%, yet more preferably in the range of 4.5 to 12.0 wt.-%, based on the total amount of the propylene homopolymer, preferably based on the total amount of the first propylene homopolymer fraction (H-PP1), the second propylene homopolymer fraction (H-PP2) and third propylene homopolymer fraction (H-PP3) together.

Preferably the first propylene homopolymer fraction (H-PP1), the second propylene homopolymer fraction (H-PP2) and the third propylene homopolymer fraction (H-PP3) differ in the melt flow rate MFR$_2$ (230° C.), more preferably differ in the melt flow rate MFR$_2$ (230° C.) by at least 30 g/10 min, yet more preferably by at least 35 g/10 min.

Preferably the first propylene homopolymer fraction (H-PP1) has a higher melt flow rate MFR$_2$ (230° C.) than the second propylene homopolymer fraction (H-PP2) and the second propylene homopolymer fraction (H-PP2) has a higher melt flow rate MFR$_2$ (230° C.) than the third propylene homopolymer fraction (H-PP3).

Accordingly it is especially preferred that
(a) the melt flow rate MFR$_2$ (230° C.) of the first propylene homopolymer fraction (H-PP1) is at least 4 times higher, preferably at least 5 times higher, more preferably 4 times to 8 times higher, still more preferably 5 times to 8 times higher, than the melt flow rate MFR$_2$ (230° C.) of second propylene homopolymer fraction (H-PP2);
and/or
(b) the melt flow rate MFR$_2$ (230° C.) of the second propylene homopolymer fraction (H-PP2) is at least 1,000 times higher, preferably at least 5,000 times higher, more preferably 1,000 times to 5,000,000 times higher, still more preferably 5,000 times to 500,000 times higher, than the melt flow rate MFR$_2$ (230° C.) of third propylene homopolymer fraction (H-PP3).

Thus in one specific embodiment the propylene homopolymer according to the present invention comprises, preferably consists of, the first propylene homopolymer fraction (H-PP1), the second propylene homopolymer fraction (H-PP2) and the third propylene homopolymer fraction (H-PP3) wherein
(a) the melt flow rate MFR$_2$ (230° C.) of the first propylene homopolymer fraction (H-PP1) is at least 300 g/10 min, more preferably in the range of 300 to 2,000 g/10 min, still more preferably in the range of 400 to 1,500 g/10 min, like in the range of 450 to 1,200 g/10 min;
and/or
(b) the melt flow rate MFR$_2$ (230° C.) of the second propylene homopolymer fraction (H-PP2) is in the range of 10.0 to below 300 g/10 min;
and/or
(c) the melt flow rate MFR$_2$ (230° C.) of the third propylene homopolymer fraction (H-PP3) is below 0.1 g/10 min, more preferably in the range of 0.000001 to below 0.1 g/10 min, still more preferably in the range of 0.00001 to 0.1 g/10 min, like in the range of 0.00001 to 0.01 g/10 min Thus it is preferred that the first propylene homopolymer fraction (H-PP1) and the second propylene homopolymer fraction (H-PP2) fulfill together the inequation (I), more preferably inequation (Ia), $$10.0 \geq \frac{MFR(H-PP1)}{MFR(H-PP2)} \geq 2.0 \quad \text{(I)}$$

$$8.0 \geq \frac{MFR(H-PP1)}{MFR(H-PP2)} \geq 3.0 \quad \text{(Ia)}$$

wherein
MFR (H-PP1) is the melt flow rate MFR$_2$ (230° C.) [g/10 min] of the first propylene homopolymer fraction (H-PP1),
MFR (H-PP2) is the melt flow rate MFR$_2$ (230° C.) [g/10 min] of the second propylene homopolymer fraction (H-PP2).

Additionally or alternatively it is preferred that the second propylene homopolymer fraction (H-PP2) and the third propylene homopolymer fraction (H-PP3) fulfill together the inequation (II), more preferably inequation (IIa), $$5 \times 10^6 \geq \frac{MFR(H-PP2)}{MFR(H-PP3)} \geq 1000 \quad \text{(II)}$$

$$5 \times 10^5 \geq \frac{MFR(H-PP2)}{MFR(H-PP3)} \geq 5000 \quad \text{(IIa)}$$

wherein
MFR (H-PP2) is the melt flow rate MFR$_2$ (230° C.) [g/10 min] of the second propylene homopolymer fraction (H-PP2),
MFR (H-PP3) is the melt flow rate MFR$_2$ (230° C.) [g/10 min] of the third propylene homopolymer fraction (H-PP3).

Additionally or alternatively it is preferred that the first propylene homopolymer fraction (H-PP1) and the propylene homopolymer (H-PP) fulfill together the inequation (III), more preferably inequation (IIIa), still more preferably inequation (IIIb), $$20.0 \geq \frac{MFR(H-PP1)}{MFR(H-PP2)} \geq 2.5 \quad \text{(III)}$$

$$15.0 \geq \frac{MFR(H-PP1)}{MFR(H-PP)} \geq 3.0 \quad \text{(IIIa)}$$

$$10.0 \geq \frac{MFR(H-PP1)}{MFR(H-PP)} \geq 3.5 \quad \text{(IIIb)}$$

wherein
MFR (H-PP1) is the melt flow rate MFR$_2$ (230° C.) [g/10 min] of the first propylene homopolymer fraction (H-PP1),
MFR (H-PP) is the melt flow rate MFR$_2$ (230° C.) [g/10 min] of the propylene homopolymer (H-PP).

Preferably the propylene homopolymer according to this invention is produced as defined in more detail below.

Preferably the first propylene homopolymer fraction (H-PP1) is produced in the first polymerization reactor (R1) whereas the second propylene homopolymer fraction (H-PP2) is produced in the second polymerization reactor (R2). The third propylene homopolymer fraction (H-PP3) is preferably produced in the third polymerization reactor (R3).

The propylene homopolymer as defined in the instant invention may contain up to 5.0 wt.-% additives (except the α-nucleating agent as defined in detail below), like antioxidants, slip agents and antiblocking agents. Preferably the additive content is below 3.0 wt.-%, like below 1.0 wt.-%.

As mentioned above in one preferred embodiment the propylene homopolymer comprises a α-nucleating agent. In another preferred embodiment the propylene homopolymer is free of α-nucleating agents, more preferably is free of any nucleating agents.

In case the propylene homopolymer comprises an α-nucleating agent, it is preferred that it is free of β-nucleating agents. The α-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butylphenyl)phosphate], and (iv) vinylcycloalkane polymer and vinylalkane polymer (as discussed in more detail below), and (v) mixtures thereof.

Such additives are generally commercially available and are described, for example, in "Plastic Additives Handbook", pages 871 to 873, 5th edition, 2001 of Hans Zweifel.

Preferably the propylene homopolymer contains up to 5 wt.-% of the α-nucleating agent. In a preferred embodiment, the propylene homopolymer contains not more than 200 ppm, more preferably of 1 to 200 ppm, more preferably of 5 to 100 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, sodium 2,2'-methylenebis (4, 6,-di-tert-butylphenyl) phosphate, vinylcycloalkane polymer, vinylalkane polymer, and mixtures thereof.

In one preferred embodiment sodium 2,2'-methylenebis (4, 6,-di-tert-butylphenyl) phosphate is used.

In the following the manufacture of the propylene homopolymer is described in more detail.

Accordingly the present invention is directed to a process for the manufacture of propylene homopolymer (H-PP) in a sequential polymerization system comprising at least two polymerization reactors ((R1) and (R2)) or at least three polymerization reactors ((R1), (R2) and (R3)) connected in series, like in a sequential polymerization system consisting of two polymerization reactors (R1) and (R2) connected in series or consisting of three polymerization reactors (R1), (R2) and (R3) connected in series, wherein the polymerization of propylene in the at least two polymerization reactors ((R1) and (R2)) or in the at least three polymerization reactors ((R1), (R2) and (R3)), like the two polymerization reactors (R1) and (R2) or the three polymerization reactors (R1), (R2) and (R3), takes place in the presence of (a) a Ziegler-Natta catalyst (ZN-C) comprising a titanium compound (TC) having at least one titanium-halogen bond, and an internal donor (ID), both supported on a magnesium halide,
(b) a co-catalyst (Co), and
(c) an external donor (ED), wherein
(i) the internal donor (ID) comprises at least 80 wt.-% of a succinate;
(ii) the molar-ratio of co-catalyst (Co) to external donor (ED) [Co/ED] is 2 to 60;
(iii) the molar-ratio of co-catalyst (Co) to titanium compound (TC) [Co/TC] is 150 to 300; and
(iv) optionally the molar-ratio of external donor (ED) to titanium compound [ED/TC] is in the range of more than 5 to below 100, preferably in the range of 20 to 70.

Preferably at least one of the two polymerization reactors ((R1) and (R2)) is a gas phase reactor, more preferably one of the two polymerization reactors (R1) and (R2) is a loop reactor (LR) whereas the other of the two polymerization reactors (R1) and (R2) is a gas phase reactor (GR1), still more preferably the first polymerization reactor (R1) is a loop reactor (LR) and the second polymerization reactor (R2) is a gas phase reactor (GPR1). Accordingly in case the sequential polymerization system consists of two polymerization reactors (R1) and (R2) the first polymerization reactor (R1) is a loop reactor (LR) and the second polymerization reactor (R2) is a first gas phase reactor (GPR1)

In case the sequential polymerization system comprises, like consist of, three polymerization reactors (R1), (R2) and (R3), at least one, preferably at least two, of the three polymerization reactors ((R1), (R2) and (R2)) is/are (a) gas phase reactors, more preferably one of the three polymerization reactors (R1), (R2) and (R3) is a loop reactor (LR) whereas as the other two of the three polymerization reactors (R1), (R2) and (R3) are gas phase reactors (GR1) and (GR2), still more preferably the first polymerization reactor (R1) is a loop reactor (LR), the second polymerization reactor is a first gas phase reactor (GPR1) and the third polymerization reactor (R2) is a second gas phase reactor (GPR2).

Preferably the operating temperature in the first polymerization reactor (R1) is in the range of 70 to 85° C. and/or the operating temperature in the second polymerization reactor (R2) and optional in the third reactor (R3) is in the range of 75 to 95° C.

It has been surprisingly found out that a propylene homopolymer (H-PP) produced according to the inventive process has a low residue content. Further the productivity of the applied catalyst is very high. Additionally with the inventive process a high molecular weight distribution can be achieved.

In the following the invention will be described in more detail.

Preferably the propylene homopolymer according to this invention is produced in a sequential polymerization system comprising at least three reactors, preferably consists of three reactors (R1), (R2) and (R23).

The term "sequential polymerization system" indicates that the propylene homopolymer is produced in at least three reactors connected in series. Accordingly the present polymerization system comprises at least a first polymerization reactor (R1), a second polymerization reactor (R2), and a third polymerization reactor (R3). The term "polymerization reactor" shall indicate that the main polymerization takes place. Thus in case the process consists of three polymerization reactors, this definition does not exclude the option that the overall system comprises for instance a pre-polymerization step in a pre-polymerization reactor. The term "consist of" is only a closing formulation in view of the main polymerization reactors.

Preferably the first polymerization reactor (R1) is a slurry reactor (SR), whereas the second polymerization reactor (R2) and the third polymerization reactor (R3) are a gas phase reactors (GPRs). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR). Accordingly the average concentration of propylene homopolymer, i.e. the first fraction ($1^{st}$ F) of the propylene homopolymer (i.e. the first propylene homopolymer fraction (H-PP1)), in the polymer slurry within the loop reactor (LR) is typically from 15 wt.-% to 55 wt.-%, based on the total weight of the polymer slurry within the loop reactor (LR). In one preferred embodiment of the present invention the average concentration of the first propylene homopolymer fraction (H-PP1) in the polymer slurry within the loop reactor (LR) is from 20 wt.-% to 55 wt.-% and more preferably from 25 wt.-% to 52 wt.-%, based on the total weight of the polymer slurry within the loop reactor (LR).

Preferably the propylene homopolymer of the first polymerization reactor (R1), i.e. the first propylene homopolymer fraction (H-PP1), more preferably the polymer slurry of the loop reactor (LR) containing the first propylene homopolymer fraction (H-PP1), is directly fed into the second polymerization reactor (R2), i.e. into the first gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the the first propylene homopolymer fraction (H-PP1), is led directly to the next stage gas phase reactor.

Alternatively, the propylene homopolymer of the first polymerization reactor (R1), i.e. the first propylene homopolymer fraction (H-PP1), more preferably polymer slurry of the loop reactor (LR) containing the first propylene homopolymer fraction (H-PP1), may be also directed into a flash step or through a further concentration step before fed into the second polymerization reactor (R2), i.e. into the first gas phase reactor (GPR1). Accordingly, this "indirect feed" refers to a process wherein the content of the first polymerization reactor (R1), of the loop reactor (LR), i.e. the polymer slurry, is fed into the second polymerization reactor (R2), into the first gas phase reactor (GPR1), via a reaction medium separation unit and the reaction medium as a gas from the separation unit.

More specifically, the second polymerization reactor (R2), and any subsequent reactor, for instance the third polymerization reactor (R3), are preferably gas phase reactors (GPRs).

Such gas phase reactors (GPR) can be any mechanically mixed or fluid bed reactors. Preferably the gas phase reactors (GPRs) comprise a mechanically agitated fluid bed reactor with gas velocities of at least 0.2 msec. Thus it is appreciated that the gas phase reactor is a fluidized bed type reactor preferably with a mechanical stirrer.

Thus in a preferred embodiment the first polymerization reactor (R1) is a slurry reactor (SR), like loop reactor (LR), whereas the second polymerization reactor (R2) and the third polymerization reactor (R3), are gas phase reactors (GPRs). Accordingly for the instant process at least three polymerization reactors (R1), (R2) and (R3), namely a slurry reactor (SR), like loop reactor (LR) and a first gas phase reactor (GPR1) and a second gas phase reactor (GPR2), connected in series are used. If needed prior to the slurry reactor (SR) a pre-polymerization reactor is placed.

The Ziegler-Natta catalyst (ZN-C) is fed into the first polymerization reactor (R1) and is transferred with the polymer (slurry) obtained in the first polymerization reactor (R1) into the subsequent reactors. If the process covers also a pre-polymerization step it is preferred that the Ziegler-Natta catalyst (ZN-C) is fed in the pre-polymerization reactor. Subsequently the pre-polymerization product containing the Ziegler-Natta catalyst (ZN-C) is transferred into the first polymerization reactor (R1).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Especially good results are achieved in case the temperature in the reactors is carefully chosen.

Accordingly it is preferred that the operating temperature in the first polymerization reactor (R1) is in the range of 70 to 85° C., more preferably in the range of 70 to 82° C., still more preferably in the range of 72 to 80° C., like in the range of 73 to 80° C., i.e. 75° C.

Alternatively or additionally to the previous paragraph it is preferred that the operating temperature in the second polymerization reactor (R2) is in the range of 70 to 95° C., more preferably in the range of 75 to 90° C., still more preferably in the range of 75 to 85° C., like in the range of 78 to 82° C., i.e. 80° C.

Alternatively or additionally to the two previous paragraphs it is preferred that the operating temperature in the third polymerization reactor (R3) is in the range of 70 to 95° C., more preferably in the range of 75 to 90° C.

Typically the pressure in the first polymerization reactor (R1), preferably in the loop reactor (LR), is in the range of from 20 to 80 bar, preferably 30 to 70 bar, like 35 to 65 bar, whereas the pressure in the second polymerization reactor (R2), i.e. in the first gas phase reactor (GPR1), and in the third polymerization reactor (R3), e.g. in the second gas phase reactor (GPR2), is in the range of from 5 to 50 bar, preferably 15 to 35 bar.

Preferably hydrogen is added in each polymerization reactor in order to control the molecular weight, i.e. the melt flow rate $MFR_2$.

Accordingly it is preferred that the hydrogen to propylene feed ratio [$H_2/C_3$] to the first polymerization reactor (R1) is in the range of 10 to 60 mol/kmol, more preferably in the range of 15 to 50 mol/kmol, and/or the hydrogen to propylene feed ratio [$H_2/C_3$] to the second polymerization reactor (R2) is in the range of 10 to 260 mol/kmol, more preferably in the range of 15 to 180 mol/kmol. In turn the hydrogen to propylene feed ratio [$H_2/C_3$] to the third reactor is in the range of 0 to 20 mol/kmol, more preferably in the range of 0 to 5.0 mol/kmol. It is especially preferred that the hydrogen and propylene feed are constant over the polymerization time.

The average residence time ($\tau$) is defined as the ratio of the reaction volume ($V_R$) to the volumetric outflow rate from the reactor ($Q_o$) (i.e. $V_R/Q_o$), i.e $\tau = V_R/Q_o$ [tau=$V_R/Q_o$]. In case of a loop reactor the reaction volume ($V_R$) equals to the reactor volume.

The average residence time ($\tau$) in the first polymerization reactor (R1) is preferably at least 20 min, more preferably in the range of 20 to 45 min, still more preferably in the range of 22 to 42 min, like in the range of 22 to 40 min, and/or the average residence time (τ) in the second polymerization reactor (R2) is preferably at least 90 min, more preferably in the range of 90 to 200 min, still more preferably in the range of 100 to 190 min, yet more preferably in the range of 105 to 180 min. Preferably the average residence time (τ) in the third polymerization reactor (R3) is at least 100 min, more preferably in the range of 100 to 300 min, still more preferably in the range of 120 to 280 min.

Further it is preferred that the average residence time (τ) in the total sequential polymerization system, more preferably that the average residence time (τ) in the first (R1) and second polymerization reactors (R2) and third polymerization reactor (R3) together, is at most 500 min, more preferably in the range of 210 to 500 min, still more preferably in the range of 220 to 400 min, still more preferably in the range of 230 to 380 min.

As mentioned above the instant process can comprises in addition to the (main) polymerization of the propylene homopolymer in the at least three polymerization reactors (R1, R3 and R3) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) is added in the polymerization process, for instance in the first reactor (R1). In one embodiment the Ziegler-Natta catalyst (ZN-C), the co-catalyst (Co), and the external donor (ED) are only added in the pre-polymerization reactor (PR), if a pre-polymerization is applied.

The pre-polymerization reaction is typically conducted at a temperature of 0 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 6 to 100 bar, for example 10 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed is employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge.

As mentioned above, if a pre-polymerization is used, subsequent to said pre-polymerization, the mixture (MI) of the Ziegler-Natta catalyst (ZN-C) and the polypropylene (Pre-PP) produced in the pre-polymerization reactor (PR) is transferred to the first reactor (R1). Typically the total amount of the polypropylene (Pre-PP) in the final propylene homopolymer (H-PP) is rather low and typically not more than 5.0 wt.-%, more preferably not more than 4.0 wt.-%, still more preferably in the range of 0.5 to 4.0 wt.-%, like in the range 1.0 of to 3.0 wt.-%.

In case that pre-polymerization is not used propylene and the other ingredients such as the Ziegler-Natta catalyst (ZN-C) are directly introduced into the first polymerization reactor (R1).

Accordingly the process according the instant invention comprises the following steps under the conditions set out above (a) in the first polymerization reactor (R1), i.e. in a loop reactor (LR), propylene is polymerized obtaining a first propylene homopolymer fraction (H-PP1) of the propylene homopolymer (H-PP), (b) transferring said first propylene homopolymer fraction (H-PP1) to a second polymerization reactor (R2), (c) in the second polymerization reactor (R2) propylene is polymerized in the presence of the first propylene homopolymer fraction (H-PP1) obtaining a second propylene homopolymer fraction (H-PP2) of the propylene homopolymer (H-PP), said first propylene homopolymer fraction (H-PP1) and said second propylene homopolymer fraction (H-PP2) form a first mixture ($1^{st}$ M), (d) transferring said first mixture ($1^{st}$ M) to the third polymerization reactor (R3), and (e) in the third polymerization reactor (R3) propylene is polymerized in the presence of the first mixture ($1^{st}$ M) obtaining a third propylene homopolymer fraction (H-PP3) of the propylene homopolymer (H-PP), said first mixture ($1^{st}$ M) and said propylene homopolymer fraction (H-PP3) form the propylene homopolymer (H-PP).

A pre-polymerization as described above can be accomplished prior to step (a).

After the polymerization the propylene homopolymer is discharged and mixed with additives as mentioned above.

As mentioned above in the specific process for the preparation of the propylene homopolymer as defined above a Ziegler-Nana catalyst (ZN-C) must be used. Accordingly the Ziegler-Natta catalyst (ZN-C) will be now described in more detail.

The Ziegler-Natta catalyst (ZN-C) comprises a titanium compound (TC), which has at least one titanium-halogen bond, and an internal donor (ID), both supported on magnesium halide, preferably in active form.

The internal donor (ID) used in the present invention comprises a succinate. The internal donor (ID) may in addition to the succinate comprise phthalate or a diether. The preferred internal donor (ID) is a succinate or a mixture of a succinate and a phthalate. It is especially preferred that the internal donor (ID) is a succinate only.

Accordingly it is preferred that the internal donor (ID) comprises succinate of at least 80 wt.-%, more preferably at least 90 wt.-%, still more preferably at least 95 wt.-% and even more preferably at least 99 wt.-%, of the total weight of the internal donor (ID). It is, however, preferred that the internal donor (ID) essentially consists, e.g. is, a succinate.

The Ziegler-Natta catalyst comprising a succinate as defined above as internal donor (ID) can for example be obtained by reaction of an anhydrous magnesium halide with an alcohol, followed by titanation with a titanium halide and reaction with the respective succinate. Such a catalyst comprises 2 to 6 wt.-% of titanium, 10 to 20 wt.-% of magnesium and 5 to 30 wt.-% of internal donor (ID) with chlorine and solvent making up the remainder.

Suitable succinates have the formula (I)

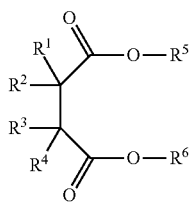

(I)

wherein $R^1$ to $R^4$ are equal to or different from one another and are hydrogen, or a $C_1$ to $C_{20}$ linear or branched alkyl, alkenyl, cycloalkyl, aryl, arylalkyl or alkylaryl group, optionally containing heteroatoms, and $R^1$ to $R^4$, being joined to the same carbon atom, can be linked together to form a cycle; and $R^5$ and $R^6$ are equal to or different from one another and are a linear or branched alkyl, alkenyl, cycloalkyl, aryl, arylalkyl or alkylaryl group, optionally containing heteroatoms.

Suitable phthalates are selected from the alkyl, cycloalkyl and aryl phthalates, such as for example diethyl phthalate, diisobutyl phthalate, di-n-butyl phthalate, dioctyl phthalate, diphenyl phthalate and benzylbutyl phthalate.

Suitable diethers are selected from 1,3-diethers of formula (II) or (III)

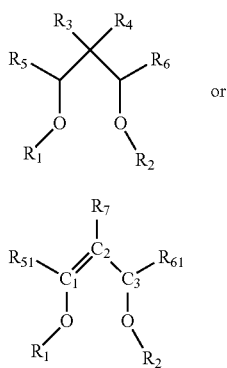

wherein in formula (II) and (III)
$R_1$ and $R_2$ are the same or different and can be a linear or branched $C_1$-$C_{12}$-alkyl, or $R_1$ with
$R_5$ and/or $R_2$ with $R_6$ can form a ring with 4 to 6 C-atoms,
$R_3$ and $R_4$ of formula (II) are the same or different and can be H or a linear or branched $C_1$-$C_{12}$-alkyl or $R_3$ and $R_4$ can form together a ring with 5 to 10 C-atoms, which can be part of an aliphatic or aromatic polycyclic ring system with 9 to 20 C-atoms,
$R_5$ and $R_6$ in formula (I) are the same or different and can be H or a linear or branched $C_1$-$C_{12}$-alkyl or can form together an aliphatic ring with 5 to 8 C-atoms,
and $R_{51}$, $R_{61}$ and $R_7$ in formula (III) are the same or different and can be H or a linear or branched $C_1$-$C_{12}$-alkyl or two or three of $R_{51}$, $R_{61}$ and $R_7$ can form together with $C_1$ to $C_3$ an aromatic ring or ring system with 6 to 14 C-atoms, preferably 10 to 14 C-atoms, or mixtures therefrom.

A Ziegler-Natta catalyst (ZN-C) comprising a succinate as internal donor (ID) is commercially available for example from Basell under the Avant ZN trade name. One particularly preferred Ziegler-Natta catalyst (ZN-C) is the catalyst ZN168M of Basell.

As further component in the instant polymerization process an external donor (ED) must be present. Suitable external donors (ED) include certain silanes, ethers, esters, amines, ketones, heterocyclic compounds and blends of these. It is especially preferred to use a silane. It is most preferred to use silanes of the general formula

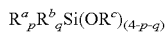

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different.

Accordingly a preferred external donor (ED) is represented by the formula

wherein R5 represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Another preferred external donor (ED) is represented by the formula

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

Specific examples of such silanes are (tert-butyl)$_2$Si(OCH$_3$)$_2$, cylohexyl methyl dimethoxy silan (cyclohexyl)(methyl)Si(OCH$_3$)$_2$ (referred to as "C donor"), (phenyl)$_2$Si(OCH$_3$)$_2$, dicyclopentyl dimethoxy silane (cyclopentyl)$_2$Si(OCH$_3$)$_2$ (referred to as "D donor") and diethylaminotriethoxysilane (CH$_3$CH$_2$)$_2$NSi(OCH$_2$CH$_3$)$_3$ (referred to as "U-donor").

The co-catalyst is preferably a compound of group 13 of the periodic table (IUPAC), e.g. organo aluminum, such as an aluminum compound, like aluminum alkyl, aluminum halide or aluminum alkyl halide compound. Accordingly in one specific embodiment the co-catalyst (Co) is a trialkyl-aluminium, like triethylaluminium (TEAL), dialkyl aluminium chloride or alkyl aluminium sesquichloride. In one specific embodiment the co-catalyst (Co) is triethylaluminium (TEAL).

Advantageously, the trialkylaluminium, like triethylaluminium (TEAL) has a hydride content, expressed as $AlH_3$, of less than 1.0 wt % with respect to the trialkylaluminium, like the triethyl aluminium (TEAL). More preferably, the hydride content is less than 0.5 wt %, and most preferably the hydride content is less than 0.1 wt %.

To obtain best the desired propylene homopolymer of the present invention the ratio between on the one hand of co-catalyst (Co) and the external donor (ED) [Co/ED] and on the other hand of the co-catalyst (Co) and the titanium compound (TC) [Co/TC] must be carefully chosen.

Accordingly
(a) the mol-ratio of co-catalyst (Co) to external donor (ED) [Co/ED] must be in the range of 2 to 60, preferably is in the range of 2 to 10, more preferably is in the range of 3 to 8, still more preferably is in the range of 4 to 7; and
(b) the mol-ratio of co-catalyst (Co) to titanium compound (TC) [Co/TC] must be in the range of 150 to 300, preferably is in the range of 170 to 280, more preferably is in the range of 190 to 270, still more preferably is in the range of 230 to 260.

It is especially preferred that the molar-ratio of external donor (ED) to titanium compound [ED/TC] is in the range of more than 5 to below 100, more preferably in the range of 20 to 70.

In the following the present invention is further illustrated by means of examples.

EXAMPLES

A. Measuring Methods

The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the isotacticity and regio-regularity of the polypropylene homopolymers.

Quantitative $^{13}C$ {$^1H$} NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For polypropylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra.

Quantitative $^{13}C$ {$^1H$} NMR spectra were processed, integrated and relevant quantitative properties determined from the integrals using proprietary computer programs.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences: [mmmm]%=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$$P_{21e}=(I_{e6}+I_{e8})/2$$

The amount of 1,2 primary inserted propene was quantified based on the methyl region with correction undertaken for sites included in this region not related to primary insertion and for primary insertion sites excluded from this region:

$$P_{12}=I_{CH3}+P_{12e}$$

The total amount of propene was quantified as the sum of primary inserted propene and all other present regio-defects:

$$P_{total}=P_{12}+P_{21e}$$

The mole percent of 2,1 erythro regio-defects was quantified with respect to all propene:

$$[21e]mol.\text{-}\%=100(P_{21e}/P_{total})$$

Calculation of melt flow rate $MFR_2$ (230° C.) of the second propylene homopolymer fraction (H-PP2):

$$MFR(PP2) = 10^{\left[\frac{\log(MFR(PP))-w(PP1)\times\log(MFR(PP1))}{w(PP2)}\right]} \quad (I)$$

wherein
w(PP1) is the weight fraction [in wt.-%] of the first propylene homopolymer fraction (H-PP1),
w(PP2) is the weight fraction [in wt.-%] of the second propylene homopolymer fraction (H-PP2),
MFR(PP1) is the melt flow rate $MFR_2$ (230° C.) [in g/10 min] of the first propylene homopolymer fraction (H-PP1), MFR(PP) is the melt flow rate MFR$_2$ (230° C.) [in g/10 min] of the propylene homopolymer obtained after the second polymerization reactor (R2), i.e. of the mixture of the first propylene homopolymer fraction (H-PP1) and second propylene homopolymer fraction (H-PP2), MFR(PP2) is the calculated melt flow rate MFR$_2$ (230° C.) [in g/10 min] of the second propylene homopolymer fraction (H-PP2).

Calculation of melt flow rate MFR$_2$ (230° C.) of the third propylene homopolymer fraction (H-PP3):

$$MFR(PP3) = 10^{\left[\frac{\log(MFR(PP))-w(PP2)\times\log(MFR(PP2))}{w(PP3)}\right]} \quad (II)$$

wherein w(PP2) is the weight fraction [in wt.-%] of the propylene homopolymer obtained after the second polymerization reactor (R2), i.e. of the mixture of the first propylene homopolymer fraction (H-PP1) and second second propylene homopolymer fraction (H-PP2), w(PP3) is the weight fraction [in wt.-%] of the third propylene homopolymer fraction (H-PP3), MFR(PP2) is the melt flow rate MFR$_2$ (230° C.) [in g/10 min] of the propylene homopolymer obtained after the second polymerization reactor (R2), i.e. of the mixture of the first propylene homopolymer fraction (H-PP1) and second propylene homopolymer fraction (H-PP2), MFR(PP) is the melt flow rate MFR$_2$ (230° C.) [in g/10 min] of the propylene homopolymer obtained after the third polymerisation reactor (R3), i.e. of the mixture of the first propylene homopolymer fraction (H-PP1), the second propylene homopolymer fraction (H-PP2) and the third propylene homopolymer fraction (H-PP3), MFR(PP3) is the calculated melt flow rate MFR$_2$ (230° C.) [in g/10 min] of the third propylene homopolymer fraction (H-PP3).

MFR$_2$ (230° C.) is measured according to ISO 1133 (230° C., 2.16 kg load)

Number average molecular weight ($M_n$), weight average molecular weight ($M_w$), z-average molecular weight ($M_z$)

Molecular weight averages Mw, Mn and Mz were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

The xylene soluble fraction at room temperature (XS, wt.-%): The amount of the polymer soluble in xylene is determined at 25° C. according to ISO 16152; first edition; 2005-07-01.

Rheology: Dynamic rheological measurements were carried out with Rheometrics RDA-II QC on compression moulded samples under nitrogen atmosphere at 230° C. using 25 mm-diameter plate and plate geometry. The oscillatory shear experiments were done within the linear viscoelastic range of strain at frequencies from 0.015 to 300 rad/s. (ISO 6721-10) The values of storage modulus (G'), loss modulus (G"), complex modulus (G') and complex viscosity (η*) were obtained as a function of frequency (w).

The Zero shear viscosity ($\eta_0$) was calculated using complex fluidity defined as the reciprocal of complex viscosity. Its real and imaginary part are thus defined by $$f'(\omega)=\eta'(\omega)/[\eta'(\omega)^2+\eta''(\omega)^2] \text{ and}$$

$$f'(\omega)=\eta''(\omega)/[\eta'(\omega)^2+\eta''(\omega)^2]$$

From the following equations $$\eta'=G''/\omega \text{ and } \eta''=G'/\omega$$

$$f'(\omega)=G''(\omega)\cdot\omega/[G'(\omega)^2+G''(\omega)^2]$$

$$f'(\omega)=G'(\omega)\cdot\omega/[G'(\omega)^2+G''(\omega)^2]$$

The complex viscosity ratio is the ratio of the complex viscosity (η*) obtained at 0.05 rad/sec to the complex viscosity (η*) obtained at 300 rad/sec.

DSC analysis, melting temperature ($T_m$) and heat of fusion ($H_f$), crystallization temperature ($T_c$) and heat of crystallization ($H_c$): measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and heat of crystallization ($H_c$) are determined from the cooling step, while melting temperature and heat of fusion ($H_f$) are determined from the second heating step p.

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Tensile test: The tensile test (modulus, strength and tensile stress at break) is measured at 23° C. according to ISO 527-1 (cross head speed 1 mm/min) using injection moulded specimens moulded at 180° C. or 200° C. according to ISO 527-2(1B), produced according to EN ISO 1873-2 (dog bone shape, 4 mm thickness).

Stepwise Isothermal Segregation Technique (SIST)

The isothermal crystallisation for SIST analysis was performed in a Mettler TA820 DSC on 3±0.5 mg samples at decreasing temperatures between 200° C. and 105° C.

(i) the samples were melted at 225° C. for 5 min.,
(ii) then cooled with 80° C./min to 145° C.
(iii) held for 2 hours at 145° C.,
(iv) then cooled with 80° C./min to 135° C.
(v) held for 2 hours at 135° C.,
(vi) then cooled with 80° C./min to 125° C.
(vii) held for 2 hours at 125° C.,
(viii) then cooled with 80° C./min to 115° C.
(ix) held for 2 hours at 115° C.,
(x) then cooled with 80° C./min to 105° C.
(xi) held for 2 hours at 105° C.

After the last step the sample was cooled down with 80° C./min to −10° C. and the melting curve was obtained by heating the cooled sample at a heating rate of 10° C./min up to 200° C. All measurements were performed in a nitrogen atmosphere. The melt enthalpy is recorded as function of temperature and evaluated through measuring the melt enthalpy of fractions melting within temperature intervals of 50 to 60° C.; 60 to 70° C.; 70 to 80° C.; 80 to 90° C.; 90 to 100° C.; 100 to 110° C.; 110 to 120° C.; 120 to 130° C.; 130 to 140° C.; 140 to 150° C.; 150 to 160° C.; 160 to 170° C.; 170 to 180° C.; 180 to 190° C.; 190 to 200° C.

B. Examples

The catalyst used in the polymerization process for the polypropylene of the inventive examples (IE1 to IE6) and the comparative examples (CE1 to CE3) was the commercial Ziegler-Natta catalyst ZN168M (succinate as internal donor, 2.5 wt.-% Ti) from Lyondell-Basell was used along with triethyl-aluminium (TEAL) as co-catalyst and dicyclo pentyl dimethoxy silane (D-donor) as donor.

The aluminium to donor ratio, the aluminium to titanium ratio and the polymerization conditions are indicated in table 1.

TABLE 1a

Preparation of inventive propylene homopolymers

|  |  | 1E1 | 1E2 | 1E3 | 1E4 | 1E5 | 1E6 |
|---|---|---|---|---|---|---|---|
| TEAL/Ti | [mol/mol] | 250 | 250 | 250 | 250 | 250 | 250 |
| TEAL/Donor | [mol/mol] | 5 | 5 | 5 | 5 | 5 | 5 |
| Donor/Ti | [mol/mol] | 50 | 50 | 50 | 50 | 50 | 50 |
| LOOP |  |  |  |  |  |  |  |
| time | [min] | 25 | 25 | 25 | 25 | 25 | 25 |
| temp | [° C.] | 75 | 75 | 75 | 75 | 75 | 75 |
| split | [wt.-%] | 58.8 | 57.5 | 54.3 | 57 | 59.2 | 54 |
| $MFR_2$ | [g/10'] | 1003 | 550 | 415 | 550 | 550 | 550 |
| $H_2/C_3$ | [mol/kmol] | 38.3 | 26.4 | 22.3 | 26.4 | 26.2 | 25.7 |
| pressure | [bar] | 49.8 | 44.4 | 42.5 | 44.5 | 44.4 | 44 |
| GPR1 |  |  |  |  |  |  |  |
| time | [min] | 154 | 121 | 106 | 115 | 115 | 111 |
| temp | [° C.] | 80 | 80 | 80 | 80 | 80 | 80 |
| split | [wt.-%] | 36.1 | 36.8 | 36.2 | 36.4 | 36.3 | 36 |
| $MFR_2$ | [g/10'] | 213 | 79 | 60 | 79 | 79 | 79 |
| $H_2/C_3$ | [mol/kmol] | 100 | 61 | 56 | 62 | 60 | 62 |
| pressure | [bar] | 32 | 32 | 32 | 32 | 32 | 32 |
| GPR2 |  |  |  |  |  |  |  |
| time | [min] | 161 | 173 | 136 | 140 | 175 | 243 |
| temp | [° C.] | 80 | 80 | 80 | 80 | 70 | 80 |
| split | [wt.-%] | 5.1 | 5.7 | 9.5 | 6.6 | 4.5 | 10.0 |
| $MFR_2$ | [g/10'] × $10^{-4}$ | 12 | 9 | 605 | 39 | 0.9 | 17 |
| $H_2/C_3$ | [mol/kmol] | 2.0 | 1.3 | 3.2 | 2.2 | 2.2 | 2.3 |
| pressure | [bar] | 32 | 32 | 32 | 32 | 25 | 32 | n.d. = not detectable

TABLE 2a

Properties of inventive propylene homopolymers

|  |  | 1E1 | 1E2 | 1E3 | 1E4 | 1E5 | 1E6 |
|---|---|---|---|---|---|---|---|
| XCS | [wt %] | 4.4 | 3.9 | 3.7 | 3.9 | 3.7 | 4.0 |
| $MFR_2$ | [g/10'] | 286 | 126 | 89 | 124 | 135 | 77 |
| Mn | [kg/mol] | 10 | 12 | 13 | 12 | 10 | 7 |
| Mw | [kg/mol] | 130 | 167 | 171 | 165 | 140 | 110 |
| Mz | [kg/mol] | 1267 | 1399 | 1128 | 1328 | 962 | 783 |
| Mw/Mn | [-] | 13.0 | 13.9 | 13.2 | 13.8 | 14.0 | 15.7 |
| Mz/Mw | [-] | 9.7 | 8.4 | 6.6 | 8.0 | 6.9 | 7.1 |
| Mz/Mn | [-] | 126.7 | 116.6 | 86.8 | 110.7 | 96.2 | 111.9 |
| Eta*(0.05/300) | [-] | 7.6 | 9.8 | 9.7 | 11.7 | — | 12.8 |
| Tm | [° C.] | 161 | 162 | 163 | 162 | 161 | — |
| Tc | [° C.] | 120 | 120 | 119 | 121 | 118 | 118 |
| 2,1 e | [%] | n.d. | n.d. | n.d. | n.d. | n.d. | n.d. |
| mmmm | [%] | 96.2 | 96.0 | 96.5 | 96.3 | 96.9 | — |
| Tg | [° C.] | −9 | −5 | −4 | −5 | — | — |

TABLE 2a-continued

Properties of inventive propylene homopolymers

|  |  | 1E1 | 1E2 | 1E3 | 1E4 | 1E5 | 1E6 |
|---|---|---|---|---|---|---|---|
| TM (180) | [MPa] | 2030 | 2033 | 1950 | 1983 | — | — |
| TS (180) | [MPa] | 28.8 | 35.3 | 35.4 | 32.5 | — | — |
| TSB (180) | [MPa] | 28.7 | 35.3 | 35.3 | 32.5 | — | — | n.d. = not detectable
TM (180) tensile modulus measured on specimen inj. moulded at 180° C.
TS (180) tensile strength measured on specimen inj. moulded at 180° C.
TSB (180) tensile stress at break measured on specimen inj. moulded at 180° C.

TABLE 3a

Properties of inventive propylene homopolymers (containing 0.15 wt.-% NA11UH)

|  |  | 1E1 | 1E2 | 1E3 | 1E4 | 1E5 | 1E6 |
|---|---|---|---|---|---|---|---|
| Tm | [° C.] | 162 | 163 | 164 | 164 | 163 | 164 |
| Tc | [° C.] | 134 | 134 | 134 | 134 | 132 | 132 |
| Tg | [° C.] | −10 | −8 | −6 | −8 | — | −6 |
| TM (180) | [MPa] | 2318 | 2347 | 2299 | 2397 | 2183* | 2377 |
| TS (180) | [MPa] | 32.4 | 35.1 | 37.4 | 36.4 | 36.0* | 38.7 |
| TSB (180) | [MPa] | 32.4 | 35.1 | 37.3 | 36.4 | 36.0* | 38.6 | n.d. = not detectable
TM (180) tensile modulus measured on specimen inj. moulded at 180° C. (* at 200° C.)
TS (180) tensile strength measured on specimen inj. moulded at 180° C. (* at 200° C.)
TSB (180) tensile stress at break measured on spec.inj. moulded at 180° C. (* at 200° C.)
NA11 UH 2,2'-methylenebis (4, 6,-di-tert-butylphenyl) phosphate TABLE 4a SIST data of the inventive propylene homopolymers

| Temp. Range/° C. | 1E1 [wt %] | 1E2 [wt %] | 1E3 [wt %] | 1E4 [wt %] | 1E5 [wt %] | 1E6 [wt %] |
|---|---|---|---|---|---|---|
| 90-100 | 0 | 0 | 0 | 0 | 0 | 0 |
| 100-110 | 0 | 0 | 0 | 0 | 0 | 0 |
| 110-120 | 0.51 | 0.16 | 0.35 | 0.21 | — | — |
| 120-130 | 0.71 | 0.69 | 0.81 | 0.79 | — | — |
| 130-140 | 1.62 | 1.69 | 1.79 | 1.79 | — | — |
| 140-150 | 7.29 | 7.59 | 7.76 | 7.52 | — | — |
| 150-160 | 29.21 | 28.34 | 27.89 | 27.44 | — | — |
| 160-170 | 55 | 54 | 53.6 | 52.74 | — | — |
| 170-180 | 9.54 | 7.51 | 7.78 | 9.54 | — | — |
| 180- | 0 | 0 | 0 | 0 | — | — |
| SIST ratio | 1.54 | 1.60 | 1.59 | 1.65 | — | — |

SIST ratio: the weight ratio of the crystalline fractions melting in the temperature range of above 160 to 180° C. to the crystalline fractions melting in the temperature range of 90 to 160 [(>160-180)/(90-160)]

TABLE 5a

SIST data of the inventive propylene homopolymers (containing 0.15 wt.-% NA11UH)

| Temp. Range/° C. | 1E1 [wt %] | 1E2 [wt %] | 1E3 [wt %] | 1E4 [wt %] | 1E5 [wt %] | 1E6 [wt %] |
|---|---|---|---|---|---|---|
| 90-100 | 0 | 0.04 | 0.15 | 0 | 0 | — |
| 100-110 | 0.03 | 0.09 | 0.21 | 0 | 0 | — |
| 110-120 | 0.39 | 0.42 | 0.54 | 0.27 | 0.22 | — |
| 120-130 | 1.12 | 1.11 | 1.19 | 0.95 | 0.8 | — |
| 130-140 | 2.32 | 2.2 | 2.24 | 1.99 | 1.83 | — |
| 140-150 | 4.89 | 4.6 | 4.64 | 4.41 | 4.3 | — |
| 150-160 | 15.09 | 14.06 | 14.3 | 14.03 | 14.15 | — |
| 160-170 | 65.54 | 57.09 | 56.88 | 58.97 | 60.2 | — |
| 170-180 | 10.62 | 20.39 | 19.81 | 19.38 | 18.48 | — |

TABLE 5a-continued

SIST data of the inventive propylene homopolymers (containing 0.15 wt.-% NA11UH)

| Temp. Range/° C. | 1E1 [wt %] | 1E2 [wt %] | 1E3 [wt %] | 1E4 [wt %] | 1E5 [wt %] | 1E6 [wt %] |
|---|---|---|---|---|---|---|
| 180- | 0 | 0 | 0 | 0 | 0 | — |
| SIST ratio | 3.19 | 3.44 | 3.29 | 3.62 | 3.69 | — |

SIST ratio: the weight ratio of the crystalline fractions melting in the temperature range of above 160 to 180° C. to the crystalline fractions melting in the temperature range of 90 to 160 [(>160-180)/(90-160)]

TABLE 1b

Preparation of comparative propylene homopolymers

| | | CE1 | CE2 | CE3 |
|---|---|---|---|---|
| TEAL/Ti | [mol/mol] | 250 | 250 | 250 |
| TEAL/Donor | [mol/mol] | 5 | 5 | 5 |
| Donor/Ti | [mol/mol] | 50 | 50 | 50 |
| LOOP | | | | |
| time | [min] | 25 | 25 | 25 |
| temp | [° C.] | 75 | 75 | 75 |
| split | [wt.-%] | 100 | 56 | 59 |
| MFR$_2$ | [g/10'] | 417 | 1003 | 1003 |
| H2/C3 | [mol/kmol] | 22.5 | 38 | 37.6 |
| pressure | [bar] | 80 | 80 | 80 |
| GPR1 | | | | |
| time | [min] | — | 154 | 175 |
| temp | [° C.] | — | 80 | 80 |
| split | [wt.-%] | — | 44 | 41 |
| MFR$_2$ | [g/10'] | — | 79 | 313 |
| H2/C3 | [mol/kmol] | — | 59 | 100 |
| pressure | [bar] | — | 32 | 32 | n.d. = not detectable

TABLE 2b

Properties of comparative propylene homopolymers

| | | CE1 | CE2 | CE3 |
|---|---|---|---|---|
| XCS | [wt %] | 4.8 | 4.2 | 4.6 |
| MFR$_2$ | [g/10'] | 494 | 355 | 627 |
| Mn | [kg/mol] | 9 | 10 | 9 |
| Mw | [kg/mol] | 106 | 110 | 92 |
| Mz | [kg/mol] | 793 | 690 | 541 |
| Mw/Mn | [-] | 11.8 | 11.0 | 10.2 |
| Mz/Mw | [-] | 7.5 | 6.3 | 5.9 |
| Mz/Mn | [-] | 88 | 69 | 60 |
| Eta * (0.05/300) | [-] | — | 2.8 | 2.8 |
| Tm | [° C.] | 160 | 162 | 160 |
| Tc | [° C.] | 121 | 121 | 121 |
| 2,1 e | [%] | n.d. | n.d. | n.d. |
| mmmm | [%] | 96.3 | 96.6 | 96.4 |
| Tg | [° C.] | -8 | -9 | -11 |
| TM (180) | [MPa] | 1895 | 1885 | 1930 |
| TS (180) | [MPa] | 27.1 | 28.6 | 26.3 |
| TSB (180) | [MPa] | 27.0 | 28.5 | 26.2 | n.d. = not detectable
TM (180) tensile modulus on specimen inj. moulded at 180° C.
TS (180) tensile strength on specimen inj. moulded at 180° C.
TSB (180) tensile stress at break on specimen inj. moulded at 180° C.

TABLE 3b

Properties of comparative propylene homopolymers (containing 0.15 wt.-% NA11UH)

| | | CE1 | CE2 | CE3 |
|---|---|---|---|---|
| Tm | [° C.] | — | 162 | 162 |
| Tc | [° C.] | — | 134 | 134 |
| Tg | [° C.] | — | — | — |
| TM (180) | [MPa] | — | 2185 | 2161 |
| TS (180) | [MPa] | — | 28.6 | 30.7 |
| TSB (180) | [MPa] | — | 28.6 | 30.7 | n.d. = not detectable
TM (180) tensile modulus on specimen inj. moulded at 180° C.
TS (180) tensile strength on specimen inj. moulded at 180° C.
TSB (180) tensile stress at break on specimen inj. moulded at 180° C.
NA11UH 2,2'-methylenebis (4,6,-di-tert-butylphenyl) phosphate TABLE 4b SIST data of the comparative propylene homopolymers

| Temp. Range/° C. | CE1 [wt %] | CE2 [wt %] | CE3 [wt %] |
|---|---|---|---|
| 90-100 | 0 | 0 | 0 |
| 100-110 | 0 | 0 | 0.22 |
| 110-120 | 0.26 | 0.29 | 0.34 |
| 120-130 | 0.87 | 0.92 | 0.88 |
| 130-140 | 2.01 | 2.03 | 1.95 |
| 140-150 | 8.04 | 7.85 | 7.84 |
| 150-160 | 32.61 | 29.61 | 31.75 |
| 160-170 | 53.67 | 54.26 | 52.01 |
| 170-180 | 2.53 | 5.04 | 5 |
| 180- | 0 | 0 | 0 |
| SIST ratio | 1.28 | 1.46 | 1.33 |

TABLE 5b

SIST data of the comparative propylene homopolymers (containing 0.15 wt.-% NA11UH)

| Temp. Range/° C. | CE1 [wt %] | CE2 [wt %] | CE3 [wt %] |
|---|---|---|---|
| 90-100 | — | — | — |
| 100-110 | — | 0.04 | — |
| 110-120 | — | 0.4 | 0.29 |
| 120-130 | — | 1.15 | 1.05 |
| 130-140 | — | 2.36 | 2.29 |
| 140-150 | — | 4.94 | 4.88 |
| 150-160 | — | 15.43 | 15.4 |
| 160-170 | — | 67.14 | 65.76 |
| 170-180 | — | 8.56 | 10.3 |
| 180- | — | 0 | 0 |
| SIST ratio | — | 3.11 | 3.18 |

The invention claimed is:

1. A propylene homopolymer having:
   (a) a melt flow rate MFR$_2$ (230° C.) measured according to ISO 1133 of 60 to 500 g/10 min;
   (b) a ratio of weight average molecular weight (Mw) to number average molecular weight (Mn) [Mw/Mn] of at least 12.0; and
   (c) a xylene cold soluble content (XCS) determined according ISO 16152 (25° C.) of 2.5 to 4.5 wt. %.

2. The propylene homopolymer according to claim 1, wherein the propylene homopolymer has a ratio of the complex viscosity eta* at 0.05 rad/sec to the complex viscosity eta* at 300 rad/sec of at least 4.0.

3. The propylene homopolymer according to claim 1, wherein the propylene homopolymer has:

(a) 2,1 erythro regio-defects of equal or below 0.4 mol. % determined by $^{13}$C-NMR spectroscopy; and/or (b) a pentad isotacticity (mmmm) of more than 95.0%.

4. The propylene homopolymer according to claim 1, wherein the propylene homopolymer has:

(a) a ratio of z-average molecular weight (Mz) to weight average molecular weight (Mw) [Mz/Mw] of at least 6.0; and/or (b) a ratio of z-average molecular weight (Mz) to number average molecular weight (Mn) [Mz/Mn] of at least 80.

5. The propylene homopolymer according to claim 1, wherein the propylene homopolymer is not nucleated and optionally has:

(a) a weight ratio of the crystalline fractions melting in the temperature range of above 160 to 180° C. to the crystalline fractions melting in the temperature range of 90 to 160° C. of at least 1.30, wherein the fractions are determined by a stepwise isothermal segregation technique (SIST), and/or (b) a crystallization temperature of at least 112° C.; and/or (c) a tensile modulus measured according to ISO 527-2 of at least 1,950 MPa.

6. The propylene homopolymer according to claim 2, wherein the propylene homopolymer is α-nucleated and optionally has:

(a) a weight ratio of the crystalline fractions melting in the temperature range of above 160 to 180° C. to the crystalline fractions melting in the temperature range of 90 to 160° C. of at least 2.90, wherein the fractions are determined by a stepwise isothermal segregation technique (SIST); and/or (b) a crystallization temperature of at least 128° C.; and/or (c) a tensile modulus measured according to ISO 527-2 of at least 2,150 MPa.

7. The propylene homopolymer according to claim 1, wherein the propylene homopolymer has a melting temperature Tm of more than 160° C.

8. The propylene homopolymer according to claim 1, wherein the propylene homopolymer (H-PP) has a first propylene homopolymer fraction (H-PP1), a second propylene homopolymer fraction (H-PP2) and a third propylene homopolymer fraction (H-PP3), the first propylene homopolymer fraction (H-PP1), second propylene homopolymer fraction (H-PP2) and third propylene homopolymer fraction (H-PP3) differ in the melt flow rate MFR$_2$ (230° C.) by at least 30 g/10 min.

9. The propylene homopolymer according to claim 8, wherein:

(a) the melt flow rate MFR$_2$ (230° C.) of the first propylene homopolymer fraction (H-PP1) is at least 4 times higher than the melt flow rate MFR$_2$ (230° C.) of the second propylene homopolymer fraction (H-PP2); and/or (b) the melt flow rate MFR$_2$ (230° C.) of the second propylene homopolymer fraction (H-PP2) is at least 1000 times higher than the melt flow rate MFR$_2$ (230° C.) of the third propylene homopolymer fraction (H-PP3).

10. The propylene homopolymer according to claim 8, wherein:

(a) the melt flow rate MFR$_2$ (230° C.) of the first propylene homopolymer fraction (H-PP1) is at least 300 g/10 min; and/or (b) the melt flow rate MFR$_2$ (230° C.) of the second propylene homopolymer fraction (H-PP2) is in the range of 10.0 to below 300 g/10 min; and/or (c) the melt flow rate MFR$_2$ (230° C.) of the third propylene homopolymer fraction (H-PP3) is below 0.1 g/10 min.

11. The propylene homopolymer according claim 6, wherein the amount:

(a) of the first propylene homopolymer fraction (H-PP1) is in the range of 40 to 60 wt. %, (b) of the second propylene homopolymer fraction (H-PP2) is in the range of 25 to 59.0 wt. %, and (c) of the third propylene homopolymer fraction (H-PP3) is in the range of 1.0 to 15.0 wt. %, based on the total amount of the propylene homopolymer.

12. A process for the manufacture of a propylene homopolymer accordingly to claim 1, in a sequential polymerization system that includes at least three polymerization reactors (R1), (R2) and (R3) connected in series, the process comprising:

polymerizing propylene in the at least three polymerization reactors (R1), (R2) and (R3) in the presence of:

(a) a Ziegler-Natta catalyst (ZN-C) comprising a titanium compound (TC) having at least one titanium-halogen bond, and an internal donor (ID), both supported on a magnesium halide, (b) a co-catalyst (Co), and (c) an external donor (ED), wherein:

the internal donor (ID) comprises at least 80 wt. % of a succinate;

the molar-ratio of co-catalyst (Co) to external donor (ED) [Co/ED] is 2 to 60; and the molar-ratio of co-catalyst (Co) to titanium compound (TC) [Co/TC] is 150 to 300.

13. The process according to claim 12, wherein:

(a) the molar-ratio of external donor (ED) to titanium compound [ED/TC] is in the range of more than 5 to below 100; and/or (b) the first polymerization reactor (R1) is a loop reactor (LR), the second polymerization reactor is a first gas phase reactor (GPR1) and the third polymerization reactor is a second gas phase reactor (GPR2).

14. The process according to claim 12, wherein:

(a) the operating temperature in the first polymerization reactor (R1) is in the range of 70 to 85° C.; and/or (b) the operating temperature in the second polymerization reactor (R2) is in the range of 70 to 95° C.; and/or (c) the operating temperature in the third polymerization reactor (R3) is in the range of 70 to 95° C.

15. The process according to claim 12, wherein:

(a) the total average residence time is at most 500 min; and/or (b) the average residence time in the polymerization first reactor (R1) is at least 20 min; and/or (c) the average residence time in the second polymerization reactor (R2) is at least 90 min; and/or (d) the average residence time in the third polymerization reactor (R3) is at least 100 min.

16. A propylene homopolymer produced by the process according to claim 12.

* * * * *